J. M. SHAW.
CIRCULAR SAWING-MACHINES.

No. 194,378.  Patented Aug. 21, 1877.

WITNESSES:
H. Rydquist
J. H. Scarborough

INVENTOR:
J. M. Shaw
BY Munn & Co
ATTORNEYS.

UNITED STATES PATENT OFFICE.

JOHN M. SHAW, OF SHAW'S MILLS, GEORGIA.

IMPROVEMENT IN CIRCULAR SAWING MACHINES.

Specification forming part of Letters Patent No. 194,378, dated August 21, 1877; application filed July 13, 1877.

*To all whom it may concern:*

Figure 1:
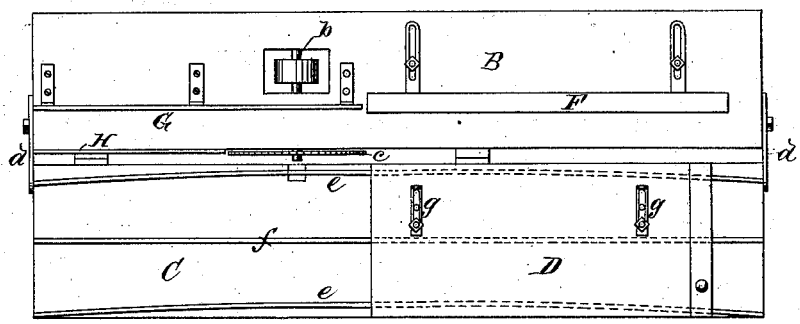
Figure 2:
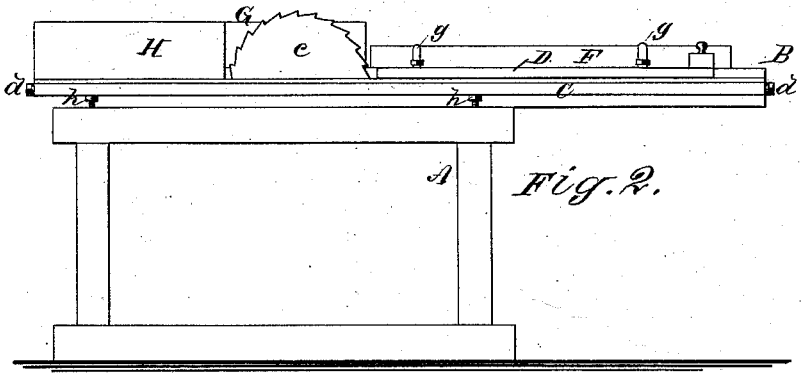
Figure 3:
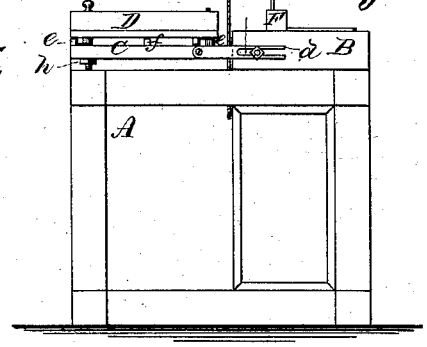
Figure 5:
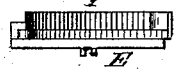
Figure 4:
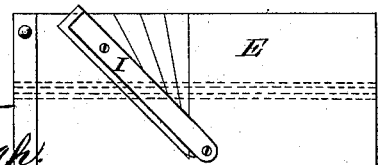

Be it known that I, JOHN M. SHAW, of Shaw's Mills, in the county of Pierce and State of Georgia, have invented a new and Improved Sawing-Machine, of which the following is a specification:

Figure 1 is a plan view. Fig. 2 is a side elevation. Fig. 3 is an end elevation. Fig. 4 is a plan view of one of the sliding tables. Fig. 5 is an end view of the same.

Similar letters of reference indicate corresponding parts.

The object of my invention is to provide a simple, inexpensive machine for sawing pickets, laths, staves, shingles, and for general work.

In the drawing, A is a frame of sufficient strength and solidity to support the saw mandrel and table, and in the said frame the saw-mandrel $b$ is journaled, and to it the table B is fixed. The front edge of the table is in line with the back side of the saw $c$.

C is a movable table that is secured to the fixed table by the slotted straps $d$. This table is pivoted in the said straps so that it may be inclined more or less from a horizontal plane by turning screws $h$ in the top of the frame A.

A curved track, consisting of the rails $e$, is formed on the table C, and a straight track, $f$, is formed in the center of the table. To the curved rails $e$ a sliding table, D, is fitted, which is provided with two adjustable gages, $g$, that project upward at right angles from the surface of the table. To the straight track $f$ a sliding table, E, is fitted.

An adjustable gage, $f$, is fitted to the fixed table B, and a guard, G, is also attached to the said table at a suitable distance from the saw, to confine the edging as it is removed from the stave, and to the edge of the table a divider, H, is attached in line with the saw.

The saw is driven by any convenient power, and when stave-bolts, pickets, or other straight work is sawed, the table E is employed, and it is also used when pickets are to be pointed, a pivoted adjustable gage, I, being attached to it for the purpose of regulating the bevel of the end of the picket.

When the curved edge of barrel-staves are trimmed the table D is used, and the gages $g$ are adjusted to suit the width of the stave. The edging that is removed from the stave is so light that it readily bends as it comes against the divider H.

Shingles may be sawed with this machine by bolting the timber and afterward setting the adjustable gage F one-half inch from the front edge of the saw and about one-eighth inch from a line drawn across the face of the saw at a distance of twenty-one inches, or a little more than the length of a shingle from the front edge of the saw. A stop-block is fastened to the track for limiting the motion of the table.

The bolt is placed upon the table and against the gage F, and is moved forward against the saw. As soon as the bolt is pushed forward it leaves the gage F, so that there is no friction between the gage and the bolt.

The bolt must be reversed end for end after having made about three shingles.

This machine is designed principally for fruit-raisers, turpentine-manufacturers, and others who have an amount of general work of this kind to do.

Having thus described my invention, I claim as new and desire to secure by Letters Patent—

1. The hinged table C and adjusting-screws $h$, in combination with the frame A and table B, substantially as shown and described.

2. The combination, in a sawing-machine, of the hinged table C, having the curved track $e$, and the table D, adapted to run upon the said track, substantially as shown and described.

3. The divider H and guide C, for confining and guiding the edging, substantially as shown and described.

JOHN M. SHAW.

Witnesses:
T. L. STRICKLAND,
D. W. WEAVER.